W. H. SAUVAGE.
HAND BRAKE.
APPLICATION FILED AUG. 7, 1919.
1,343,008.
Patented June 8, 1920.
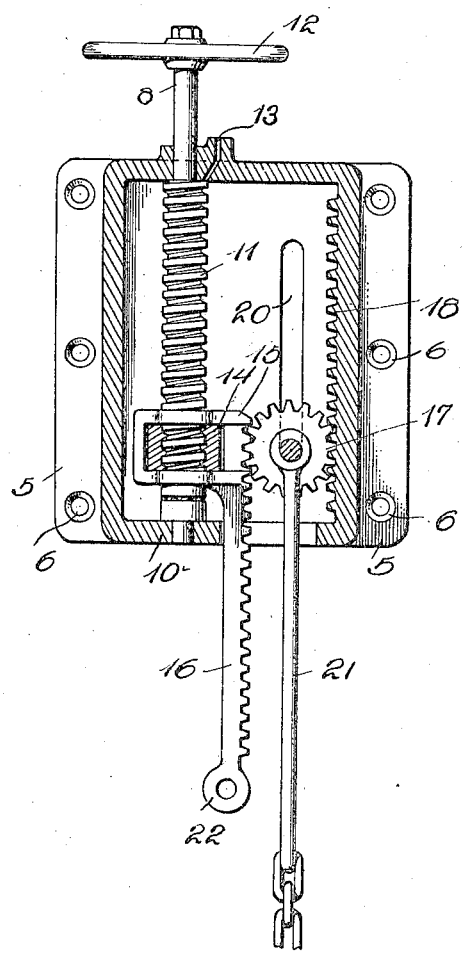
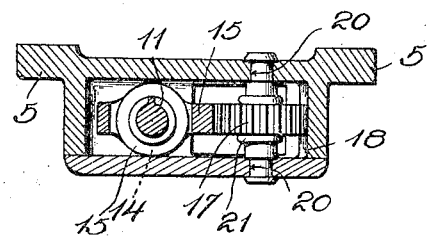
Inventor
W. H. Sauvage

UNITED STATES PATENT OFFICE.

WILLIAM H. SAUVAGE, OF BUFFALO, NEW YORK.

HAND-BRAKE.

1,343,008.   Specification of Letters Patent.   Patented June 8, 1920.

Application filed August 7, 1919. Serial No. 315,908.

*To all whom it may concern:*

Be it known that I, WILLIAM H. SAUVAGE, a citizen of the United States, residing at Buffalo, in the county of Erie and State of New York, have invented certain new and useful Improvements in Hand-Brakes, of which the following is a specification.

This invention relates to improvements in hand brakes and more particularly high power hand brakes particularly adaptable for use on railway vehicles of all kinds.

One of the objects of the present invention is to provide a high power quick-acting hand brake suitable for use on railway vehicles having relatively few parts which may be inexpensively manufactured, assembled and installed. Another object is to provide a high power hand brake which will be substantially "fool-proof" and free from parts likely to get out of order. A further object is to provide a hand brake of high efficiency which may be quickly applied and released.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings like characters of reference denote corresponding parts throughout all the views, in which—

Figure 1 is a side elevational view partly in section showing such parts as are necessary to fully understand the present invention;

Fig. 2 is a detail view of a part of the mechanism shown in Fig. 1.

Referring now to the drawings in detail 5 denotes the casing or box of the desired size, shape and construction adapted to be secured directly to the end wall of a car for example by means of fastening devices passing through holes 6 in the side flanges. A removable front cover is preferably used to protect elements from the atmosphere.

Mounted at one side of the casing is a shaft 8 passing through the top and having a roller bearing 10 at the bottom and threaded as indicated at 11 throughout the major portion of its length. The upper part of the shaft 8 is provided with any suitable hand operated mechanism, such as a wheel 12. An oil hole 13 is employed for lubricating purposes. This threaded shaft is adapted to be engaged by a nut 14 within a rectangular housing 15 at the upper part of a movable rack member 16, whereby as the shaft 8 is rotated this nut and rack will be moved relatively upward. The teeth of the rack 16 are adapted to coact with a pinion 17 the opposite side of which engages teeth 18 preferably cast on the inner wall of the housing 5. A detachable rack member could of course be used if so desired but this would only increase the expense of manufacture and assembling. The pinion 17 is adapted to move up and down in opposite guides 20, one being on the inner surface of the removable cover. It is provided with a clevis 21 coacting at its lower end in any desired manner with a chain or other flexible power transmitting mechanism for conveying movement to the brake rigging. An eye 22 is provided at the lower end of the rack 16 for directly connecting this chain, if so desired, when low power is all that is required. Of course if very high power is necessary a looped chain may be connected to either of the chains attached to the eye 22 or the lower end of the clevis 21 passing under a sheave which is connected to the chain to the brake rigging. This is all a matter of engineering judgment variable as circumstances require and need not be specifically shown.

The operation of this device is believed to be clear from the above. It may be stated however that by simply turning the hand wheel 12 the nut 14 will move relatively upward on the threaded shaft 8 and transmit motion through the rack 16 to the pinion 17, which travels along the rack 18 on the inner surface of the housing. This relative upward movement of the rack 16 and clevis 21 is transmitted to the foundation brake rigging according to the type of connections as previously described. When chain is connected directly to clevis 21 double power is obtained against attaching chain to 22 direct for one half power derived at 21.

It is thus seen that the present invention provides a simple and practical hand brake mechanism adapted to accomplish, among others, all of the objects and advantages herein set forth.

I realize that considerable variation is possible in the details of construction and arrangement of parts without departing from the spirit of my invention, and I therefore do not intend to limit myself to the specific form shown and described.

I claim—

1. In a hand brake mechanism in combination, a casing, a threaded power shaft, a rack on the inner surface of the casing, and a member movable on rotation of the shaft and engaging said rack for applying the brakes.

2. In a hand brake mechanism in combination, a threaded power shaft, a rack adapted to be moved thereby, intervening mechanism for transmitting motion from the shaft to the rack as the shaft rotates, a second rack, and a pinion adapted to be connected with the brake rigging and roll along said racks as the power shaft is operated.

3. In a hand brake mechanism in combination, a threaded power shaft, a rack adapted to be moved thereby, intervening mechanism for transmitting motion from the shaft to the rack as the shaft rotates, a second rack, a pinion adapted to be connected with the brake rigging and roll along said racks as the power shaft is operated, and a thrust bearing at the lower end of said power shaft.

4. In a hand brake mechanism in combination, a power shaft threaded throughout a portion of its length, a nut adapted to travel along said threads, and a rack adapted to be connected with the foundation brake rigging supported by and movable with said nut to exert a pull on the foundation brake rigging.

5. In a hand brake mechanism in combination, a power shaft threaded throughout a portion of its length, a nut adapted to travel along said threads, a rack supported by and movable with said nut, and a member adapted to be rotated by said rack to exert a pull on the foundation brake rigging.

6. In a hand brake mechanism, in combination, a housing, a threaded shaft mounted in said housing, means for rotating said shaft, a member engaging said threads, a rack carried thereby and movable therewith, a second rack, a pinion rotatably engaging said racks, and means connecting said pinion with the foundation brake rigging.

7. In a hand brake mechanism, in combination, a housing, a threaded shaft mounted in said housing, means for rotating said shaft, a member engaging said threads, a rack carried thereby and movable therewith, a second rack, a pinion rotatably engaging said racks, and means connecting one of said parts with the foundation brake rigging.

8. In a hand brake mechanism, in combination, a housing, a threaded shaft mounted in said housing, means for rotating said shaft, a nut engaging said threads, a rack carried by the nut and movable therewith, a second rack, a pinion rotatably engaging said racks, means connecting said pinion with the foundation brake rigging, and means whereby said pinion and first mentioned rack may be connected with said brake rigging.

In testimony whereof I affix my signature.

WILLIAM H. SAUVAGE.